United States Patent
Machnicki et al.

(10) Patent No.: US 9,201,821 B2
(45) Date of Patent: Dec. 1, 2015

(54) INTERRUPT TIMESTAMPING

(71) Applicant: Apple Inc., Cupertino, CA (US)

(72) Inventors: Erik P. Machnicki, San Jose, CA (US);
Josh P. de Cesare, Campbell, CA (US);
Manu Gulati, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 240 days.

(21) Appl. No.: 13/629,509

(22) Filed: Sep. 27, 2012

(65) Prior Publication Data
US 2014/0089546 A1 Mar. 27, 2014

(51) Int. Cl.
*G06F 13/24* (2006.01)

(52) U.S. Cl.
CPC ...................... *G06F 13/24* (2013.01)

(58) Field of Classification Search
CPC .............................. G06F 13/24–13/26; G06F 2213/24–2213/2424
USPC ........................................................ 710/269
See application file for complete search history.

(56) References Cited

U.S. PATENT DOCUMENTS

| | | | |
|---|---|---|---|
| 5,944,840 A * | 8/1999 | Lever | 714/34 |
| 6,785,893 B2 * | 8/2004 | Morris et al. | 719/318 |
| 7,197,586 B2 | 3/2007 | Dewitt, Jr. et al. | |
| 7,818,754 B2 | 10/2010 | Morris et al. | |
| 7,991,933 B2 * | 8/2011 | Diaz et al. | 710/261 |
| 8,010,726 B2 * | 8/2011 | Francis | 710/266 |
| 8,607,083 B2 * | 12/2013 | Kaburlasos et al. | 713/320 |
| 2005/0091554 A1 | 4/2005 | Loukianov | |
| 2012/0081385 A1 * | 4/2012 | Cote et al. | 345/589 |

* cited by examiner

*Primary Examiner* — Thomas J Cleary
(74) *Attorney, Agent, or Firm* — Rory D. Rankin; Meyertons, Hood, Kivlin, Kowert & Goetzel, P.C.

(57) ABSTRACT

A system and method for maintaining accurate interrupt timestamps. A semiconductor chip includes an interrupt controller (IC) with an interface to multiple sources of interrupts. In response to receiving an interrupt, the IC copies and records the value stored in a main time base counter used for maintaining a global elapsed time. The IC sends an indication of the interrupt to a corresponding processor. Either an interrupt service routine (ISR) or a device driver requests a timestamp associated with the interrupt. Rather than send a request to the operating system to obtain a current value stored in the main time base counter, the processor requests the recorded timestamp from the IC. The IC identifies the stored timestamp associated with the interrupt and returns it to the processor.

19 Claims, 5 Drawing Sheets

INTERRUPT TIMESTAMPING

BACKGROUND OF THE INVENTION

1. Field of the Invention

This invention relates to semiconductor chips, and more particularly, to maintaining accurate interrupt timestamps.

2. Description of the Relevant Art

A computing system such as a semiconductor chip may include multiple functional blocks or units, each capable of processing data. In some embodiments, the multiple functional units are individual dies on an integrated circuit (IC), such as a system-on-a-chip (SOC). In other embodiments, the multiple functional units are individual dies within a package, such as a multi-chip module (MCM). In yet other embodiments, the multiple functional units are individual dies or chips on a printed circuit board.

The computing system may also include multiple sources of interrupts. The multiple sources may include external peripheral devices and the internal functional units. An interrupt controller (IC) may receive an asserted interrupt and determine a corresponding priority level. In addition, the IC may identify a given one of the functional units in the computing system for handling the interrupt. For example, a graphics processor may be identified for processing video data associated with a given interrupt. Alternatively, a general-purpose processor or another single-instruction-multiple-data (SIMD) processor may be identified for processing audio data associated with a given interrupt.

At a later time, the IC may send an interrupt request to the identified processor. The processor may be in a low-power mode, such as an idle power-performance state (p-state). An appreciable amount of time may elapse for the processor to transition to an active p-state. Additionally, the priority level of the received interrupt may be below a threshold for the processor to immediately service it. The interrupt may be stored in a queue and wait for servicing. Again, an appreciable amount of time may elapse before the processor actually begins servicing the received interrupt.

When the interrupt is being serviced, either an interrupt service routine (ISR) or a device driver may direct the processor to send a request to the operating system (OS) for a current global value of elapsed time stored in a main time base counter. However, the OS may be busy with other operations. Additionally, the request for the current global elapsed time may have a priority level below a threshold for the OS to immediately service it. An appreciable amount of time may elapse before the ISR or the device driver receives the global elapsed time.

The interrupt to service may correspond to processing data that is to be synchronized with the processing of other data by another processor. For example, the processor may be directed by an audio device driver to process audio data that is to be synchronized with the processing of graphics data being processed by another processor. A media player may have sent the asserted interrupt to the IC. However, the multiple delays incorporated into the system between a first point-in-time the IC received the asserted interrupt from the source and a second point-in-time the ISR or the device driver received the global time base may be too great to synchronize the processing of two sets of data by two processors.

In view of the above, methods and mechanisms for maintaining accurate interrupt timestamps are desired.

SUMMARY OF EMBODIMENTS

Systems and methods for maintaining accurate interrupt timestamps are contemplated. In various embodiments, a computing system, such as a semiconductor chip, includes an interrupt controller (IC) with an interface to multiple sources of interrupts. The sources may include a variety of external peripheral devices and functional units within the semiconductor chip. In response to receiving an interrupt, the IC copies the value stored in a main time base counter used for maintaining a global elapsed time. The IC stores the value as a timestamp associated with the received interrupt.

The IC sends an indication of the interrupt to a corresponding processor. Either an interrupt service routine (ISR) or a device driver requests a timestamp associated with the interrupt. Rather than send a request to the operating system to obtain a current value stored in the main time base counter, the processor sends a request to the IC. The IC identifies the stored timestamp associated with the interrupt and returns the stored value to the processor. The processor is now ready to process corresponding data based at least in part on the timestamp received from the IC, rather than based only on the current value of the main time base counter. Using the timestamp recorded in the IC may allow the processor to synchronize processing of the corresponding data with processing of other data in another processor. For example, a media player may assert the interrupt and send the interrupt to the IC. A first processor may process audio data associated with the content to be played by the media player. A second processor, such as a graphics processor, may process video data associated with the content to be played by the media player. Using the timestamp recorded by the IC for the processing of each of the audio data and the video data, the separate processing may be synchronized.

These and other embodiments will be further appreciated upon reference to the following description and drawings.

Figure 1:
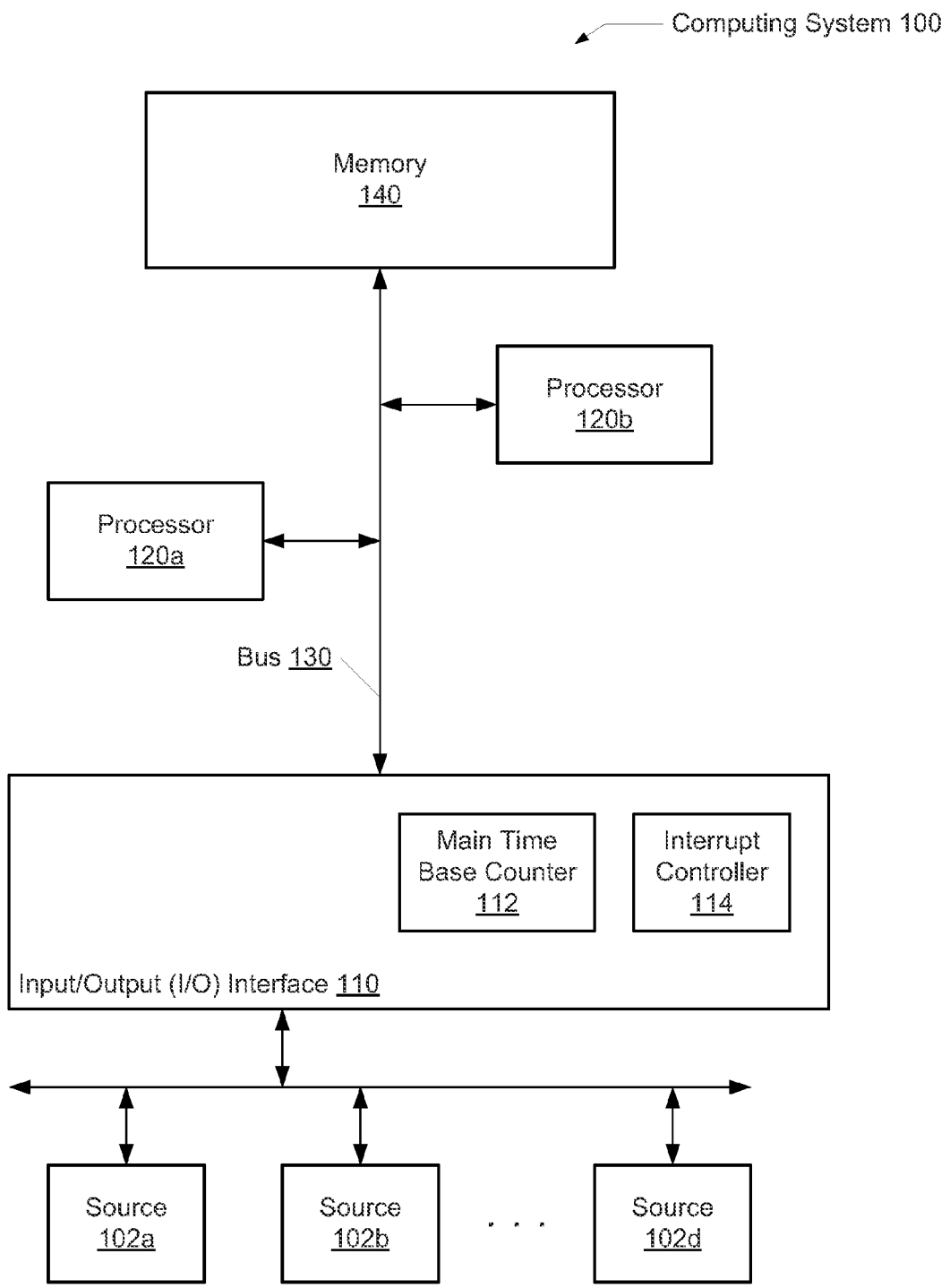
FIG. 1 is a generalized block diagram of one embodiment of a computing system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Referring to FIG. 1, a generalized block diagram of one embodiment of a computing system 100 capable of providing accurate interrupt timestamps for synchronizing two separate data processes is shown. As shown, processors 120a-120b are connected to a bus 130. The processors may send and receive requests and responses to and from the memory 140 and the input/output (I/O) interface 110 through the bus 130. Although only two processors are shown, any number of processors may be included in the computing system 100. The shared memory 140 may include on-chip caches and off-chip memory.

The processors 120a-120b may have a homogeneous architecture. For example, each of the processors 120a-120b may be a general-purpose processor. Alternatively, the processors may have heterogeneous architectures. One of the processors 120a-120b may be a general-purpose processor and the other one of the processors 120a-120b may be a single-instruction-multiple-data (SIMD) processor.

The I/O interface 110 may include queues for storing both incoming and outgoing traffic. The traffic may include requests and corresponding response data. The I/O interface may include control logic for performing a given protocol to communicate with a given source. Requests and responses may be received and sent to the processors 120a-120b and to the sources 102a-102d. Any number of the sources 102a-102d may be on-chip devices. Alternatively, one or more of the sources 102a-102d may be on-chip functional units. The off-chip sources of the sources 102a-102d may be any variety of computer peripheral devices or other processors of another computing system. The on-chip sources of the sources 102a-102d may include a variety of functional units, such as audio, video, camera, and telephony controllers.

The I/O interface 110 may include a main time base counter 112 for maintaining a global measurement of elapsed time. The counter 112 may be started at system reset and not stopped or reset until the next system reset. The I/O interface 110 may also include an interrupt controller (IC) 114 for receiving and routing interrupts from the multiple components within and connected to the computing system 100. For example, any one of the processors 120a-120b and the sources 102a-102d may assert an interrupt and send it to the IC 114. The IC 114 may assign a priority level to the received interrupt and record an associated timestamp. The timestamp may be a copy of the current value stored in the counter 112. Additionally, the IC 114 may determine which one of the processors 120a-120b is to service the interrupt. Identification information, status information, the timestamp, the priority level, and an identifier (ID) of the selected one of the processors 120a-120b may be stored in a queue.

The IC 114 may receive multiple interrupts from a single source, such as a media player. The media player may request to have both video data and audio data processed for near future playback. The IC 114 may receive these interrupts and perform the steps described above including recording associated timestamps. The IC 114 may later send interrupt requests to the corresponding processors of the processors 120a-120b. For example, the processor 120a may be a SIMD processor within a graphics processing unit (GPU) and it receives an interrupt request to process the video data. The processor 120b may be a general-purpose processor with one or more processor cores. The processor 120b may receive an interrupt request to process the audio data.

In response to receiving the interrupt request and not being in a low-power or sleep mode, each of the processors 120a-120b may handle its respective interrupt request according to the priority level of the interrupt. An interrupt service routine (ISR) may be called to handle the interrupt. The ISR may cause the processor to temporarily suspend one or more processes and then begin executing the corresponding subroutine of the ISR. A device driver may be called within one of the steps of the ISR to perform the processing of the data. The audio device driver may be called through the operating system (OS), but this step may consume an appreciable amount of time dependent upon the activity level of the OS. In the case of the audio processing, an audio device driver may be called to direct the processor 120b to process the audio data.

The audio device driver may include algorithms for the audio processing and additionally to synchronize the audio processing with the video processing performed by the processor 120a. The audio device driver knows the time between samples and the audio and video sample rates dependent on the type of the source, such as telephony, movie, and television. However, the audio device driver still needs to know when did the audio interrupt occur from the source, such as a media player. The delay from the source to the IC 114 may be negligible. Therefore, the timestamp recorded by the IC 114 may serve as the time the interrupt initiated.

Sending a request to the OS to retrieve a current value stored in the counter 112 would include erroneous delays for the audio device driver. The delays would include at least the time durations for the IC 114 to send the interrupt request to the processor 120b, the time duration for the processor 120b to transition from a low-power or sleep mode, if necessary; the time duration for the processor 120b to begin handling the interrupt and call the corresponding ISR; and the time duration for the OS to be notified and to call the audio device driver.

The delays listed above may add an appreciable amount of error to the processing performed by the algorithms within the audio device driver and prevent accurate synchronization with the processing of the video data. Therefore, the audio device driver may direct the processor 120b to send a request to the IC 114 for the recorded timestamp. The IC 114 may lookup the associated timestamp and may return it to the processor 120b. The delays listed above are not included in this recorded value and the errors may be avoided during the audio processing directed by the algorithms within the audio device driver.

Each of the processors 120a-120b may include timestamp registers. In response to calling an associated ISR, each of the processors 120a-120b may send a request to obtain a copy of the current value of the counter 112. At a later time, such as when the interrupt servicing is completed, each of the processors 120*a*-120*b* may send their respective timestamps to the memory 140 for storage. Additionally, the IC 114 may send its timestamp to the memory 140 for storage. The stored timestamps used with other stored timestamps for other interrupt requests may be used to monitor system behavior.

Figure 2:
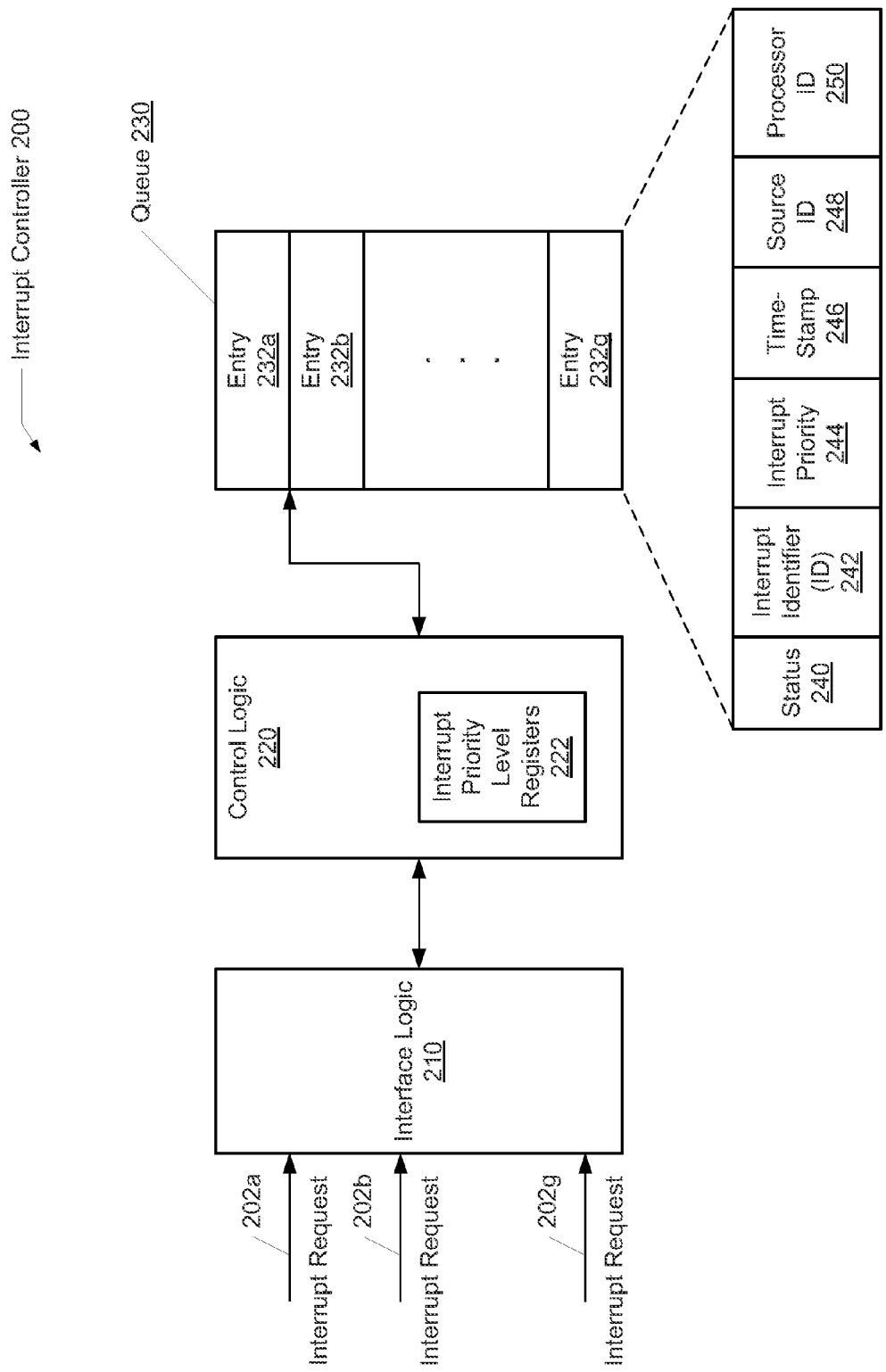
FIG. 2 is a generalized block diagram of one embodiment of an interrupt controller.

Referring now to FIG. 2, a generalized block diagram of one embodiment of an interrupt controller 200 is shown. As shown, the interrupt controller (IC) 200 includes interface logic 210, control logic 220, and a queue 230. The interface logic 210 may receive interrupt requests 202*a*-202*g* from multiple sources. The interface logic 210 may include control logic for handling communication protocols with the multiple sources.

"The control logic 220 may include vector tables for masking received interrupt requests. The control logic may also include interrupt priority level registers 222 for assigning a priority level to the received interrupt requests. A received interrupt request may be stored in one of the entries 232*a*-232*g* of the queue 230. Each one of the entries 232*a*-232*g* may store multiple fields. A status field 240 may include valid information and a state of the processing of the interrupt, such as whether an indication has been sent to a corresponding processor and whether the processor has serviced the interrupt. The identifier (ID) field 242 may store an interrupt type ID or a specific ID defining the interrupt. The interrupt priority may be stored in field 244. The control logic 220 and the registers 222 may determine the priority."

The field 246 in the queue 230 may store an associated timestamp for the interrupt. The timestamp may be a value copied from the main time base counter for the system at the time the interrupt request was received or shortly after its processing within the IC 200. The source ID stored in the field 248 may identify the source of the received interrupt. The processor ID stored in the field 250 may identify the processor selected to service the interrupt. Although the fields 240-250 are shown in a particular order, any order may be used for storing the information corresponding to the fields 240-250. Additionally, the information may not be stored in contiguous locations.

The control logic 220 may select one or more entries of the entries 232*a*-232*g* storing interrupt requests with a highest priority. Information stored in one or more of the fields 240-250 may be sent to the processor identified in the field 250. In some cases, a packet may be sent with the information across a link or switch fabric to the identified processor.

In some cases, the identified processor is in a low-power mode or sleep mode. The control logic 220 may be notified ahead of time and use this information to determine which interrupt requests to send. Alternatively, the control logic determines the mode based on no acknowledgment or a late acknowledgment from the processor regarding receiving the interrupt request. Once transitioned to an active mode of operation from the low-power or sleep mode, the processor may call an associated interrupt service routine (ISR).

In response to receiving an acknowledgment, the status information stored in the field 240 may be updated. For example, the status information may be updated to indicate the interrupt request is not requesting service, as it is currently being serviced. Alternatively, the queue 230 may be partitioned into multiple smaller queues. Each partition may represent a different level of interrupt processing for the stored interrupt requests. Therefore, as processing progresses, the requests may be moved from one partition to another.

The ISR or a device driver may direct the processor to request the associated timestamp for the interrupt request. In response to receiving the request for the timestamp, the control logic 220 may index the queue 230 and read the timestamp value stored in the corresponding one of the entries 232*a*-232*g*. The IC 200 may then send the read out timestamp to the processor.

When the associated ISR and/or device driver has completed, the ISR may send an indication of completion to the control logic 220. In response, the interrupt request corresponding to the completed routine may have an associated entry of the entries 232*a*-232*g* invalidated, such as updating the status information to indicate the interrupt request is no longer in service.

Figure 3:
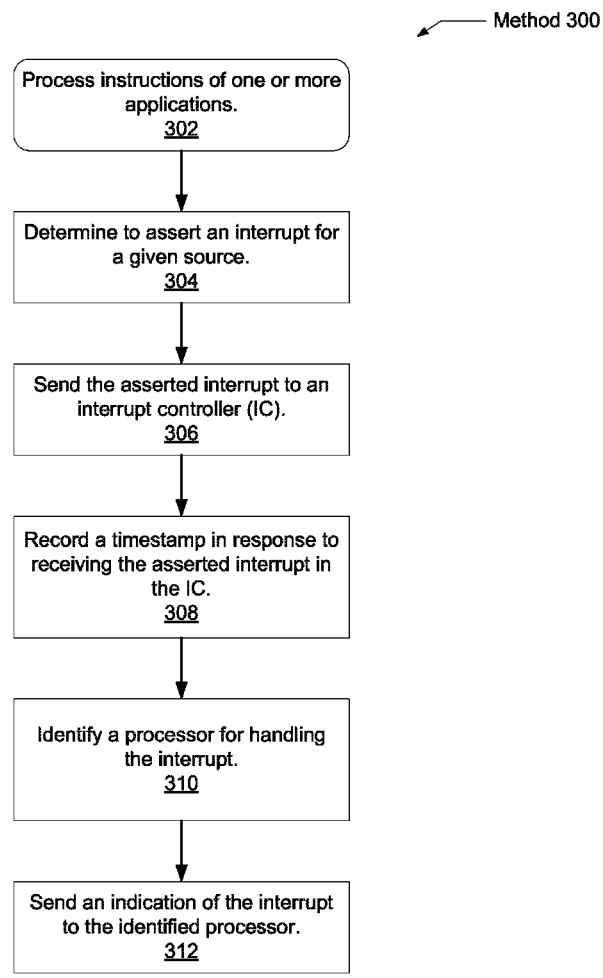
FIG. 3 is a generalized flow diagram of one embodiment of a method for receiving an interrupt request and recording an associated timestamp.

Referring now to FIG. 3, a generalized flow diagram of one embodiment of a method 300 for receiving an interrupt request and recording an associated timestamp is shown. For purposes of discussion, the steps in this embodiment are shown in sequential order. However, in other embodiments some steps may occur in a different order than shown, some steps may be performed concurrently, some steps may be combined with other steps, and some steps may be absent.

In block 302, instructions of one or more software applications are processed by a computing system. In some embodiments, the computing system is an embedded system, such as a system-on-a-chip (SOC). In block 304, a given source determines to assert an interrupt. For example, the source may be a media player or an online communications application with a camera and a microphone. The source may determine video and audio data is to be processed for near future playback. In block 306, an asserted signal or a packet corresponding to the interrupt request is sent to an interrupt controller (IC) within the system.

In block 308, a timestamp is recorded in response to the IC receives the asserted interrupt. The timestamp may be a copy of a current value stored in a main time base counter for the system. In block 310, a processor for handling the interrupt may be identified. In block 312, an indication of the interrupt may be sent to the identified processor. In various embodiments, when the indication of the interrupt is sent to the processor, another timestamp may be obtained. In this manner, the latency between the time the interrupt controller recorded the assertion of the interrupt and the time the interrupt was sent to the processor may be determined. Such information may provide additional insight into the behavior of the system. As may be appreciated, other timestamps may be obtained as well to provide even further insight into the behavior of the system. Numerous such embodiments are possible and are contemplated.

Figure 4:
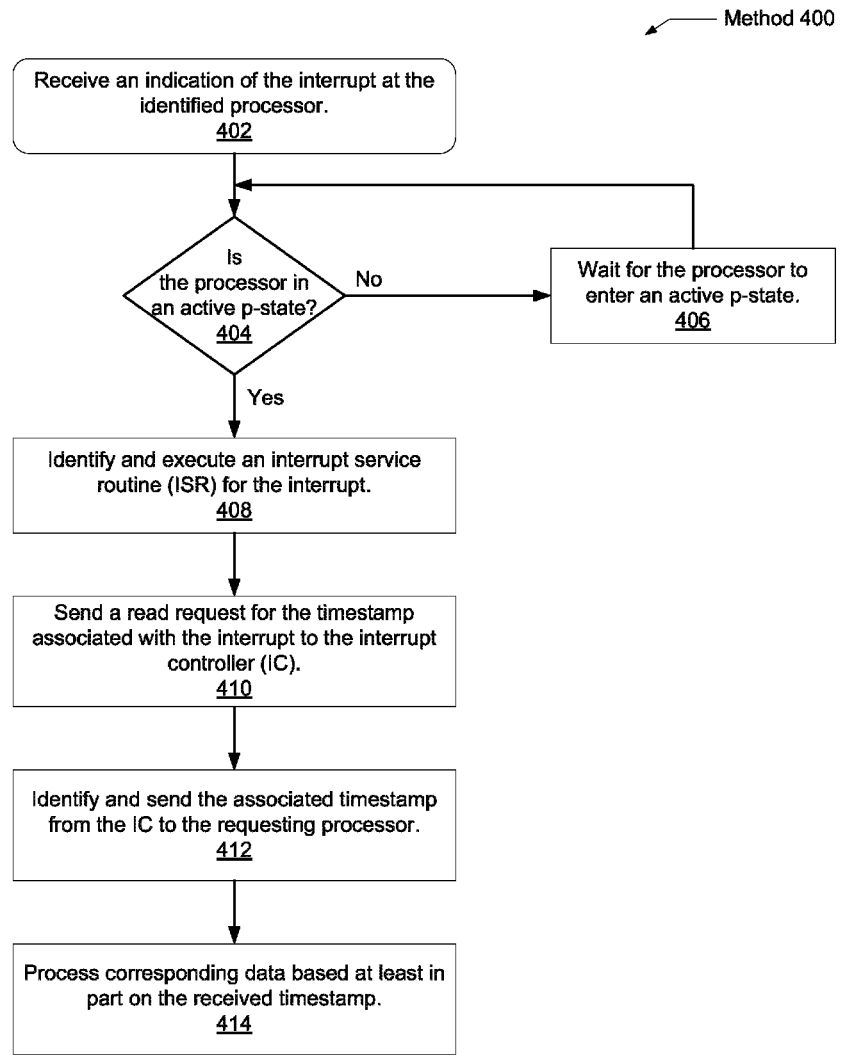
FIG. 4 is a generalized flow diagram of one embodiment of a method for using a recorded timestamp in the interrupt controller during servicing of the interrupt.

Turning now to FIG. 4, a generalized flow diagram of one embodiment of a method 400 for using a recorded timestamp in the interrupt controller during servicing of the interrupt is shown. For purposes of discussion, the steps in this embodiment are shown in sequential order. However, in other embodiments some steps may occur in a different order than shown, some steps may be performed concurrently, some steps may be combined with other steps, and some steps may be absent.

In block 402, an indication of an interrupt from the interrupt controller (IC) is received at the identified processor. If the processor is not in an active p-state (conditional block 404), then in block 406, the handling of the interrupt waits for the processor to enter an active p-state. The IC may have knowledge of the p-state of the processor. Alternatively, the IC may not receive an acknowledgment until the processor at least enters the active p-state. If the processor is in an active p-state (conditional block 404), then in block 408, the processor may identify and execute an interrupt service routine (ISR) for the interrupt.

In block 410, the processor may send a read request for the timestamp associated with the interrupt to the interrupt controller (IC). Either the ISR or an associated device driver may direct the processor to generate and send the request to the IC. In block 412, the IC may identify and send the associated timestamp to the requesting processor. In block 414, the processor may process corresponding data based at least in part on the received timestamp.

The device driver for the source of the interrupt, such as an audio device driver for a medial player, may include both user-mode components and kernel-mode components. A vendor may supply the user-mode driver and the kernel-mode driver. The operation system (OS) may load a separate copy of the user-mode driver for each application. The user-mode driver may be a dynamic-link library (DLL) that is loaded by corresponding application programming interfaces (APIs) in the OS graphics APIs. Alternatively, runtime code may be used to install the user-mode driver. In some cases, the user-mode driver may be an extension to the Direct3D and OpenGL software development kits (SDKs).

Figure 5:
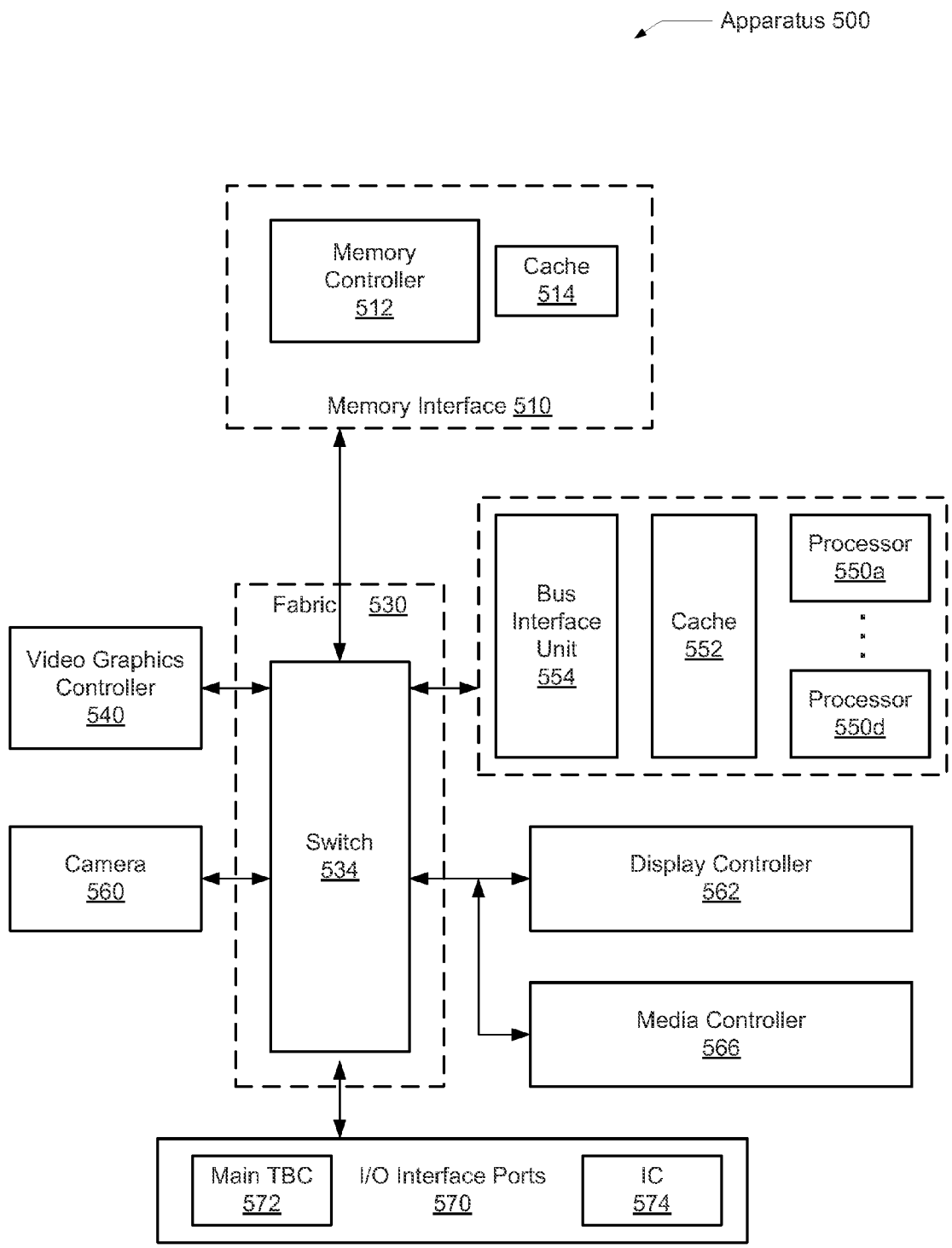
FIG. 5 is a generalized block diagram of one embodiment of an apparatus capable of servicing interrupts with an accurate interrupt timestamp.

Referring to FIG. 5, a generalized block diagram illustrating one embodiment of an apparatus 500 capable of servicing interrupts with an accurate interrupt timestamp is shown. The apparatus 500 includes multiple functional blocks or units. In some embodiments, the multiple functional units are individual dies on an integrated circuit (IC), such as a system-on-a-chip (SOC). In other embodiments, the multiple functional units are individual dies within a package, such as a multi-chip module (MCM). In yet other embodiments, the multiple functional units are individual dies or chips on a printed circuit board. The multiple functional blocks or units may each be capable of accessing a shared memory.

In various embodiments, the apparatus 500 is a SOC that includes multiple types of IC designs on a single semiconductor die, wherein each IC design provides a separate functionality. The IC designs on the apparatus 500 may also be referred to as functional blocks, functional units, or processing units on the apparatus 500. Traditionally, each one of the types of IC designs, or functional units, may have been manufactured on a separate silicon wafer. In the illustrated embodiment, the apparatus 500 includes multiple IC designs; a fabric 530 for high-level interconnects and chip communication, a memory interface 510, and various input/output (I/O) interfaces 570. Clock sources, such as phase lock loops (PLLs), and a centralized control block for at least power management are not shown for ease of illustration.

"The multiple IC designs within the apparatus 500 may include various analog, digital, mixed-signal and radio-frequency (RF) blocks. For example, the apparatus 500 may include one or more processors 550*a*-550*d* with a supporting cache hierarchy that includes at least cache 552. In some embodiments, the cache 552 may be a shared level two (L2) cache for the processors 550*a*-550*d*. In addition, the multiple IC designs may include a display controller 562, and a media controller 566. Further, the multiple IC designs may include a video graphics controller 540 and one or more processing blocks associated with realtime memory performance for display and camera subsystems, such as camera 560."

Any real-time memory peripheral processing blocks may include image blender capability and other camera image processing capabilities as is well known in the art. The apparatus 500 may group processing blocks associated with non-real-time memory performance, such as the media controller 566, for image scaling, rotating, and color space conversion, accelerated video decoding for encoded movies, audio processing and so forth. The units 560 and 566 may include analog and digital encoders, decoders, and other signal processing blocks. In other embodiments, the apparatus 500 may include other types of processing blocks in addition to or in place of the blocks shown.

In various embodiments, different types of traffic may flow independently through the fabric 530. The independent flow may be accomplished by allowing a single physical fabric bus to include a number of overlaying virtual channels, or dedicated source and destination buffers, each carrying a different type of traffic. Each channel may be independently flow controlled with no dependence between transactions in different channels.

The memory interface 510 may include one or more memory controllers and one or more memory caches for the off-chip memory, such as synchronous DRAM (SDRAM). The memory caches may be used to reduce the demands on memory bandwidth and average power consumption. In various embodiments, the memory interface 510 includes memory controller 512 and memory cache 514.

The display controller 562 sends graphics output information that was rendered to one or more display devices. The rendering of the information may be performed by the display controller 562, by the video graphics controller 540, or by both controllers 562 and 540. Alternatively, the display controller 562 may send graphics output information to the video graphics controller 540 to be output to one or more display devices. The graphics output information may correspond to frame buffers. The frame data may be for an image to be presented on a display. The frame data may include at least color values for each pixel on the screen.

Each one of the processors 550*a*-550*d* may include one or more cores and one or more levels of a cache memory subsystem. Each core may support the out-of-order execution of one or more threads of a software process and include a multi-stage pipeline. Each one of the processors 550*a*-550*d* may include circuitry for executing instructions according to a predefined general-purpose instruction set. For example, the ARM®, x86®, x86-64®, Alpha®, MIPS®, PA-RISC®, SPARC® or any other instruction set architecture may be selected.

Generally, the processors 550*a*-550*d* may include multiple on-die levels (L1, L2, L3 and so forth) of caches for accessing data and instructions. If a requested block is not found in the on-die caches or in the off-die cache 552, then a read request for the missing block may be generated and transmitted to the memory interface 510. Flash memory (not shown) used in the system may be a non-volatile memory block formed from an array of flash memory cells. Alternatively, the flash memory may include other nonvolatile memory technology. The bus interface unit (BIU) 554 may provide memory access requests and responses for at least the processors 550*a*-550*d*.

The processors 550*a*-550*d* may share the on-chip flash memory and the off-chip DRAM accessed through the memory interface 510 with other processing blocks, such as graphics processing units (GPUs), application specific integrated circuits (ASICs), and other types of processor cores.

Other processor cores on apparatus 500 may not include a mirrored silicon image of processors 550*a*-550*d*. These other processing blocks may have a micro-architecture different from the micro-architecture used by the processors 550*a*-550*d*. For example, other processors may have a micro-architecture that provides high instruction throughput for a computational intensive task, such as a single instruction multiple data (SIMD) core. Examples of SIMD cores include graphics processing units (GPUs), digital signal processing (DSP) cores, or other. For example, the video graphics controller 540 may include one or more GPUs for rendering graphics for games, user interface (UI) effects, and other applications.

The apparatus 500 may include processing blocks for real-time memory performance, such as the camera 560 and the display controller 562, as described earlier. In addition, the apparatus 500 may including processing blocks for non-real-time memory performance for image scaling, rotating, and color space conversion, accelerated video decoding for encoded movies, audio processing and so forth. The media controller 566 is one example.

The I/O interface ports 570 may include interfaces well known in the art for one or more of a general-purpose I/O (GPIO), a universal serial bus (USB), a universal asynchronous receiver/transmitter (uART), a FireWire interface, an Ethernet interface, an analog-to-digital converter (ADC), a DAC, and so forth. The I/O interface 570 may include a main time base counter 572 for maintaining a global measurement of elapsed time. The counter 572 may be started at system reset and not stopped or reset until the next system reset. The I/O interface 570 may also include an interrupt controller (IC) 574 for receiving and routing interrupts from the multiple components within and connected to the apparatus 500. The counter 572 and the IC 574 may be used for servicing interrupts with an accurate timestamp as previously described.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
a source configured to assert an interrupt;
a first processor configured to process first data;
a second processor configured to process second data; and
an interrupt controller (IC) configured to:
in response to receiving the interrupt from the source, record a first timestamp indicating a time the interrupt from the source is received which is prior to an interrupt service routine (ISR) being called for handling the interrupt; and
send an indication of the interrupt to the first processor; and
wherein in response to the first processor receiving the indication of the interrupt from the IC when the first processor is not in a low-power mode, the first processor is configured to call the ISR, and in response to calling the ISR record a second timestamp indicating a time the ISR is called; and
wherein in response to executing the ISR for handling the interrupt from the source, each of the first processor and the second processor is configured to generate a read request to send to the IC for the first timestamp and utilize the first timestamp to synchronize processing of the first data by the first processor with processing of the second data by the second processor.

2. The apparatus as recited in claim 1, wherein the first processor is further configured to generate a read request to send to the IC for the second timestamp responsive to calling the ISR, wherein in response to receiving the read request for the second timestamp after the ISR is called, the IC is further configured to send the second timestamp to the first processor, and wherein in response to receiving the read request from the first processor for the first timestamp after the ISR begins handling the interrupt, the IC is further configured to send the first timestamp to the first processor.

3. The apparatus as recited in claim 2, wherein in response to receiving the first timestamp from the IC, the first processor is further configured to process first data based at least in part on the first timestamp, rather than process the first data alone with a third timestamp recorded after the IC sends an indication of the interrupt to the processor.

4. The apparatus as recited in claim 2, wherein the apparatus further comprises a main time base counter configured to maintain a global elapsed time for the apparatus, wherein to record the first timestamp, the IC is further configured to copy a value of the time base counter at a time of receiving the interrupt from the source, and wherein to send the second timestamp, the IC is further configured to send a current value of the time base counter to the first processor.

5. The apparatus as recited in claim 1, wherein each of the IC and the first processor are further configured to store the first timestamp and the second timestamp, respectively, in a memory for later diagnostics of a behavior of the apparatus.

6. The apparatus as recited in claim 1, wherein the source corresponds to a media player, the first data corresponds to audio data, and the second data corresponds to video graphics data.

7. The apparatus as recited in claim 6, wherein the apparatus is a system-on-a-chip (SOC).

8. A method comprising:
asserting an interrupt from a source;
in response to receiving the interrupt from the source in an interrupt controller (IC), recording within the IC a first timestamp indicating a time the interrupt from the source is received which is prior to an interrupt service routine (ISR) being called for handling the interrupt;
sending an indication of the interrupt from the IC to a first processor configured to process first data;
wherein in response to the first processor receiving the indication of the interrupt from the IC when the first processor is not in a low-power mode, calling the ISR, and in response to calling the ISR recording a second timestamp indicating a time the ISR is called; and
wherein in response to executing the ISR for handling the interrupts from the source:
generating in the first processor and a second processor configured to process second data a read request to the IC for the first timestamp; and
utilizing the first timestamp to synchronize processing of the first data by the first processor with processing of the second data by the second processor.

9. The method as recited in claim 8, wherein the method further comprises generating a read request to send to the IC for the second timestamp responsive to calling the ISR, wherein in response to receiving the read request for the second timestamp after the ISR is called, the method further comprises sending the second timestamp to the first processor, and wherein in response to receiving the read request from the first processor for the first timestamp after the ISR begins handling the interrupt, the method further comprises sending the first timestamp from the IC to the processor.

10. The method as recited in claim 9, wherein in response to receiving in the first processor the first timestamp from the IC, the method further comprises processing first data based at least in part on the first timestamp, rather than processing the first data alone with a third timestamp recorded after the IC sends an indication of the interrupt to the processor.

11. The method as recited in claim 9, wherein to record the first timestamp, the method further comprises copying a value of a main time base counter at a time of receiving the interrupt from the source, wherein the main time base counter maintains a global elapsed time, and wherein to send the second timestamp, the method further comprises sending a current value of the time base counter to the first processor.

12. The method as recited in claim 8, further comprising storing the first timestamp and the third timestamp, respectively, in a memory for later diagnostics of a behavior of a system comprising at least the first processor and the IC.

13. The method as recited in claim 8, wherein the source corresponds to a media player, the first data corresponds to audio data, and the second data corresponds to video graphics data.

14. An interrupt controller comprising:
an interface configured to receive a plurality of asserted interrupts from a plurality of sources;
a queue comprising a plurality of entries, each entry configured to store an interrupt and an associated timestamp; and
control logic configured to:
in response to receiving a first interrupt from a first source, record a first timestamp indicating a time the first interrupt from the first source is received which is prior to an interrupt service routine (ISR) being called for handling the first interrupt; and
send an indication of the first interrupt to a first processor configured to process first data;
wherein in response to the first processor receiving an indication of the first interrupt from the control logic when the first processor is not in a low-power mode:
receive a request from the first processor for a copy of the first timestamp;
receive a request from a second processor for a copy of the first timestamp;
receive a request from the first processor to record a second timestamp indicating a time the ISR is called by the first processor;
receive a request from a second processor to record a third timestamp indicating a time a corresponding ISR is called by the second processor.

15. The interrupt controller as recited in claim 14, wherein the control logic is further configured to store one or more of the first timestamp and the second timestamp in a memory for later diagnostics of system behavior.

16. The interrupt controller as recited in claim 15, wherein to record each of the first timestamp and the second timestamp, the control logic is further configured to copy a value of a main time base counter at a time of receiving the interrupt from the first source, wherein the main time base counter maintains a global elapsed time, and wherein to send the second timestamp, the control logic is further configured to send a current value of the time base counter to the first processor.

17. A non-transitory computer readable storage medium comprising program instructions operable to maintain accurate interrupt timestamps a computing system, wherein the program instructions are executable to:
assert an interrupt from a source;
in response to receiving the interrupt from the source in an interrupt controller (IC), record within the IC a first timestamp indicating a time the interrupt from the source is received which is prior to an interrupt service routine (ISR) being called for handling the interrupt;
send an indication of the interrupt from the IC to a first processor configured to process first data; and
wherein in response to the first processor receiving the indication of the interrupt from the IC and the first processor is not in a low-power mode, call the ISR, and in response to calling the ISR record a second timestamp indicating a time the ISR is called; and
wherein in response to executing the ISR for handling the interrupts from the source:
generate in the first processor and a second processor configured to process second data a read request to the IC for the first timestamp; and
utilize the first timestamp to synchronize processing of the first data by the first processor with processing of the second data by the second processor.

18. The storage medium as recited in claim 17, wherein the program instructions are further executable to generate a read request to send to the IC for the second timestamp responsive to calling the ISR, wherein in response to receiving the read request for the second timestamp after the ISR is called, the program instructions are further executable to send the second timestamp to the first processor, and wherein in response to receiving the read request from the first processor for the first timestamp after the ISR begins handling the interrupt, the program instructions are further executable to send the first timestamp from the IC to the first processor.

19. The storage medium as recited in claim 18, wherein in response to receiving in the first processor the first timestamp from the IC, the program instructions are further configurable to process first data based at least in part on the first timestamp, rather than processing the first data alone with a third timestamp recorded after the IC sends an indication of the interrupt to the processor.

* * * * *